(12) United States Patent
Rondeau

(10) Patent No.: US 6,783,018 B1
(45) Date of Patent: Aug. 31, 2004

(54) LID DEVICE FOR A MINNOW BUCKET

(76) Inventor: Gary M. Rondeau, 16520 Goodwin Ave., Hastings, MN (US) 55033

(*) Notice: Subject to any disclaimer, the term of this patent is extended or adjusted under 35 U.S.C. 154(b) by 0 days.

(21) Appl. No.: 09/865,305

(22) Filed: May 25, 2001

(51) Int. Cl.$^7$ ................................................ B65D 51/18
(52) U.S. Cl. .................... 220/254.3; 220/835; 220/325; 43/56
(58) Field of Search .................. 220/254.3, 835, 220/820, 810, 325; 43/55, 56

(56) References Cited

U.S. PATENT DOCUMENTS

| | | | |
|---|---|---|---|
| 1,470,199 A | | 10/1923 | Small |
| 1,489,255 A | * | 4/1924 | Lane ............................. 43/55 |
| 1,742,046 A | | 12/1929 | Moore |
| 2,511,353 A | * | 6/1950 | Leaf ......................... 126/376.1 |
| 2,689,427 A | * | 9/1954 | Piker et al. ..................... 43/55 |
| 2,800,244 A | * | 7/1957 | Witt ........................ 220/254.5 |
| 2,870,932 A | | 1/1959 | Davis |
| 3,005,571 A | * | 10/1961 | Hall ............................ 220/324 |
| 3,130,855 A | * | 4/1964 | Gunn, Jr. ..................... 220/324 |
| 3,220,140 A | * | 11/1965 | Shirley, Sr. ..................... 43/55 |
| 3,344,552 A | | 10/1967 | Glasco |
| 4,794,723 A | | 1/1989 | Arnold et al. |
| 4,845,886 A | * | 7/1989 | Robinson ........................ 43/55 |
| 4,893,723 A | * | 1/1990 | Seabolt ....................... 220/570 |
| D350,900 S | | 9/1994 | Goetz |
| 5,634,291 A | * | 6/1997 | Pham ............................ 43/57 |
| D389,553 S | | 1/1998 | Muto |
| 5,743,425 A | * | 4/1998 | Ellis ........................... 220/254 |

* cited by examiner

Primary Examiner—Tri M. Mai

(57) ABSTRACT

A lid device for a minnow bucket for converting a conventional bucket into a minnow bucket. The lid device for a minnow bucket includes a panel having a top side, a bottom side and a peripheral edge. The panel has a diameter generally equal to an inner diameter of a bucket. A peripheral lip is coupled to and extends upwardly from the peripheral edge. The peripheral lip has a bottom edge having a slot extending upwardly therein and adapted for receiving a top edge of the bucket, the panel has an opening therein. A door selectively opens and closes the opening. The door has a shape generally identical to a shape of the opening. The door is hingedly, coupled to the panel such that the door may be moved between an open and a closed position. The door has a plurality of holes extending therethrough.

2 Claims, 2 Drawing Sheets

LID DEVICE FOR A MINNOW BUCKET

BACKGROUND OF THE INVENTION

1. Field of the Invention

The present invention relates to minnow bucket devices and more particularly pertains to a new lid device for a minnow bucket for converting a conventional bucket into a minnow bucket.

2. Description of the Prior Art

The use of minnow bucket devices is known in the prior art. More specifically, minnow bucket devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,742,046; U.S. Pat. No. 2,689,427; U.S. Des. Pat. No. 389,553; U.S. Pat. No. 4,794,723; U.S. Pat. No. 2,870,932; U.S. Pat. No. 1,470,199; U.S. Pat. No. 3,344,552; and U.S. Pat. No. 3,220,140

While these devices fulfill their respective, particular objectives and requirements, the aforementioned patents do not disclose a new lid device for a minnow bucket. The inventive device includes a panel having a top side, a bottom side and a peripheral edge. The panel has a diameter generally equal to an inner diameter of a bucket. A peripheral lip is coupled to and extends upwardly from the peripheral edge. The peripheral lip has a bottom edge having a slot extending upwardly therein and adapted for receiving a top edge of the bucket, the panel has an opening therein. A door selectively opens and closes the opening. The door has a shape generally identical to a shape of the opening. The door is hingedly coupled to the panel such that the door may be moved between an open and a closed position. The door has a plurality of holes extending therethrough.

In these respects, the lid device for a minnow bucket according to the present invention substantially departs from the conventional concepts and designs of the prior art, and in so doing provides an apparatus primarily developed for the purpose of converting a conventional bucket into a minnow bucket.

SUMMARY OF THE INVENTION

In view of the foregoing disadvantages inherent in the known types of minnow bucket devices now present in the prior art, the present invention provides a new lid device for a minnow bucket construction wherein the same can be utilized for converting a conventional bucket into a minnow bucket.

The general purpose of the present invention, which will be described subsequently in greater detail, is to provide a new lid device for a minnow bucket apparatus and method which has many of the advantages of the minnow bucket devices mentioned heretofore and many novel features that result in a new lid device for a minnow bucket which is not anticipated, rendered obvious, suggested, or even implied by any of the prior art minnow bucket devices, either alone or in any combination thereof.

To attain this, the present invention generally comprises a panel having a top side, a bottom side and a peripheral edge. The panel has a diameter generally equal to an inner diameter of a bucket. A peripheral lip is coupled to and extends upwardly from the peripheral edge. The peripheral lip has a bottom edge having a slot extending upwardly therein and adapted for receiving a top edge of the bucket, the panel has an opening therein. A door selectively opens and closes the opening. The door has a shape generally identical to a shape of the opening. The door is hingedly coupled to the panel such that the door may be moved between an open and a closed position. The door has a plurality of holes extending therethrough.

There has thus been outlined, rather broadly, the more important features of the invention in order that the detailed description thereof that follows may be better understood, and in order that the present contribution to the art may be better appreciated. There are additional features of the invention that will be described hereinafter and-which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new lid device for a minnow bucket apparatus and method which has many of the advantages of the minnow bucket devices mentioned heretofore and many novel features that result in a new lid device for a minnow bucket which is not anticipated, rendered obvious, suggested, or even implied by any of the prior art minnow bucket devices, either alone or in any combination thereof.

It is another object of the present invention to provide a new lid device for a minnow bucket which may be easily and efficiently manufactured and marketed.

It is a further object of the present invention to provide a new lid device for a minnow bucket which is of a durable and reliable construction.

An even further object of the present invention is to provide a new lid device for a minnow bucket which is susceptible of a low cost of manufacture with regard to both materials and labor, and which accordingly is then susceptible of low prices of sale to the consuming public, thereby making such lid device for a minnow bucket economically available to the buying public.

Still yet another object of the present invention is to provide a new lid device for a minnow bucket which provides in the apparatuses and methods of the prior art some of the advantages thereof, while simultaneously overcoming some of the disadvantages normally associated therewith.

Still another object of the present invention is to provide a new lid device for a minnow bucket for converting a conventional bucket into a minnow bucket.

Yet another object of the present invention is to provide a new lid device for a minnow bucket which includes a panel having a top side, a bottom side and a peripheral edge. The panel has a diameter generally equal to an inner diameter of a bucket. A peripheral lip is coupled to and extends upwardly from the peripheral edge. The peripheral lip has a bottom edge having a slot extending upwardly therein and adapted for receiving a top edge of the bucket, the panel has an opening therein. A door selectively opens and closes the opening. The door has a shape generally identical to a shape of the opening. The door is hingedly coupled to the panel such that the door may be moved between an open and a closed position. The door has a plurality of holes extending therethrough.

Still yet another object of the present invention is to provide a new lid device for a minnow bucket that allows the utilization of buckets as minnow buckets which may contain a large amount of water and minnows.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
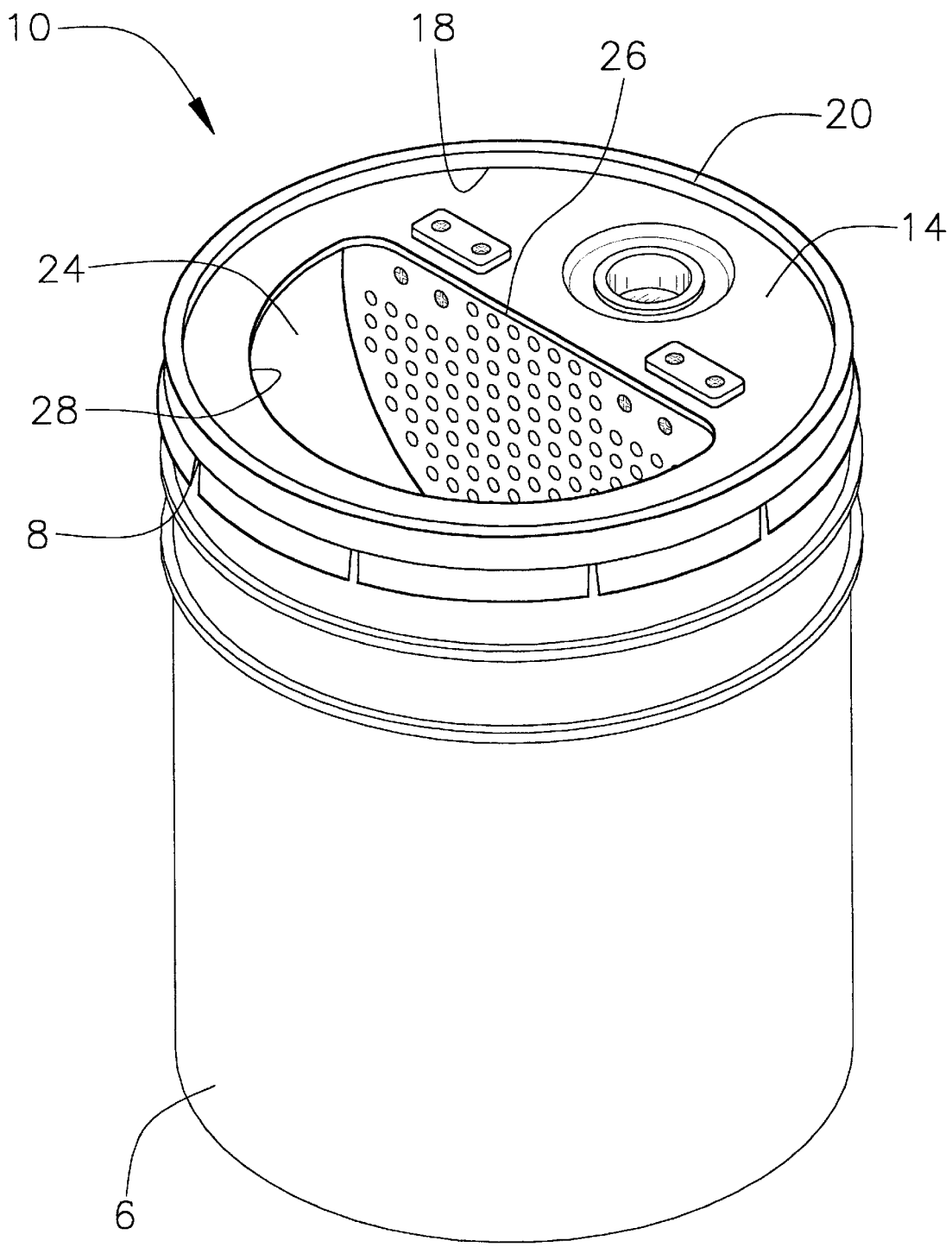
FIG. 1 is a schematic perspective view of a new lid device for a minnow bucket according to the present invention.
Figure 2:
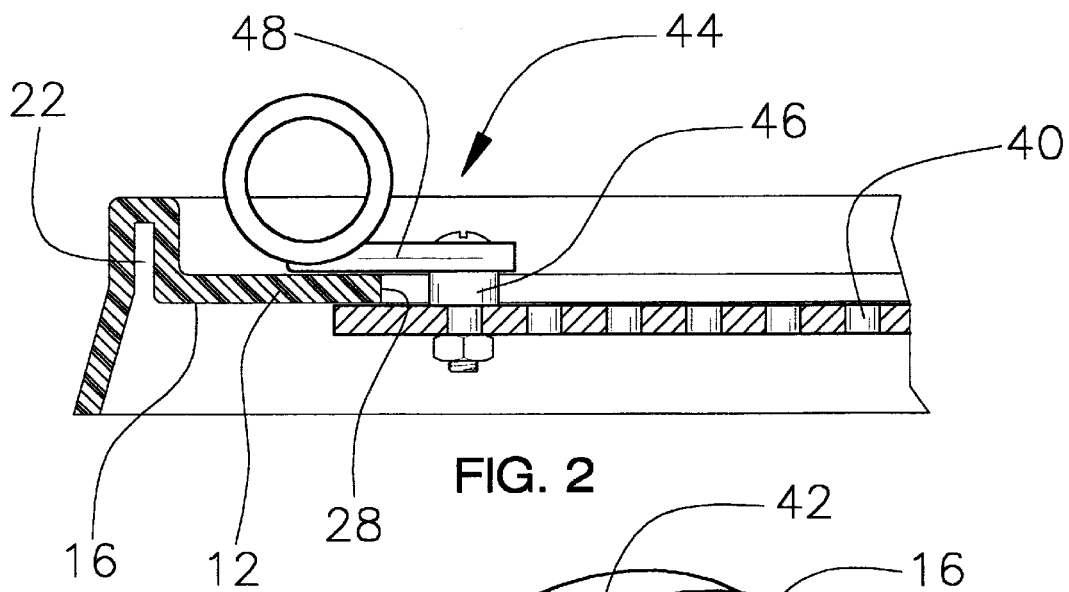
FIG. 2 is a schematic cross-sectional view of the present invention.
Figure 3:
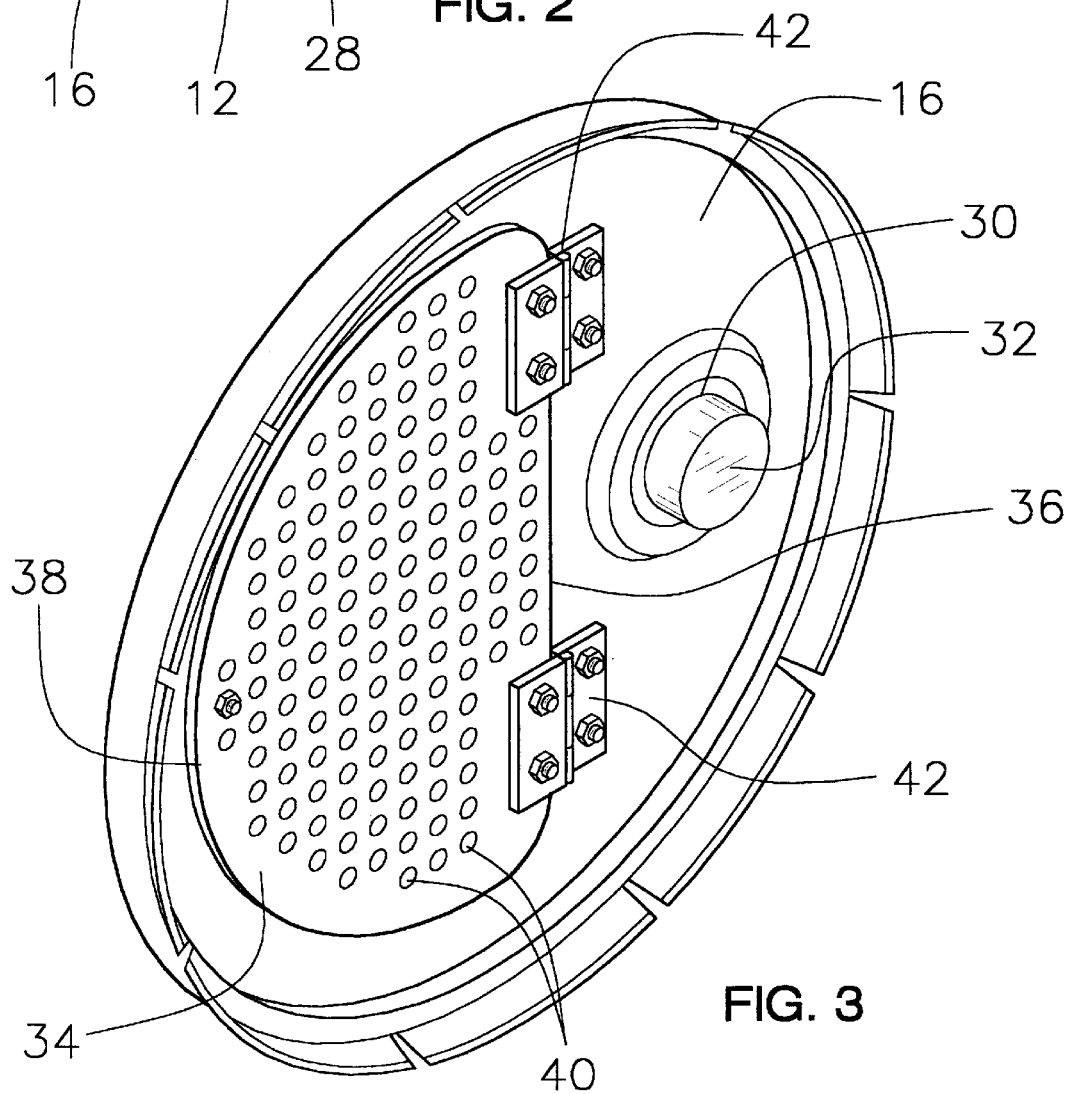
FIG. 3 is a schematic perspective bottom view of the present invention.

With reference now to the drawings, and in particular to FIGS. 1 through 3 thereof, a new lid device for a minnow bucket embodying the principles and concepts of the present invention and generally designated by the reference numeral 10 will be described.

As best illustrated in FIGS. 1 through 3, the lid device for a minnow bucket 10 generally comprises a lid device for removably coupling to a top edge 8 of a conventional five gallon bucket 6 for converting the bucket 6 into a minnow bucket.

The device 10 includes a panel 12 having a top side 14, a bottom side 16 and a peripheral edge. 18. The panel 12 has a diameter generally equal to an inner diameter of the bucket 6. A peripheral lip 20 is coupled to and extends upwardly from the peripheral edge 18. The peripheral lip 20 has a bottom edge having a slot 22 extending upwardly therein and adapted for receiving the top edge 8 of the bucket 6 The panel 12 has an opening 24 therein having a generally semi-circular shape such that a straight edge 26 and an arcuate edge 28 are defined. An aperture 30 extends through the panel 12. A plug 32 is removably positionable in the aperture and frictionally coupling to an edge of the aperture 30.

A door 34 selectively opens and closes the opening 24. The door 34 has a shape generally identical to a shape of the opening 24 and has a straight edge 36 and an arcuate edge 38. The door 34 has a size greater than the opening 24. The door 34 is hingedly coupled to the bottom side 16 of the panel 12 by a pair of hinges 42 such that the straight edge 36 of the door 34 is adjacent to and extends along a length of the straight edge 26 of the opening 24. The door 34 may be moved between an open and a closed position. The door 34 has a plurality of holes 40 extending therethrough for allowing air into the bucket 6.

A securing means 44 selectively secures the door 34 in the closed position. The securing means 44 comprises a latch rotatably coupled to the door. The latch includes a rod 46 rotatably coupled to the door and a plate 48 extending away from the rod 46 in a perpendicular orientation to the rod. The rod 46 is located generally adjacent to the arcuate edge 38 of the door 34. The plate 48 is positionable over the top side 14 of the panel 12.

In use, the user places the lid on the bucket and frictionally coupled the lid to the bucket. The bucket may then be filled with minnow and water. The door allows access to the minnows while providing air into the bucket.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A lid device for removably coupling to a top edge of a bucket for converting said bucket into a minnow bucket, said device comprising:

a panel having a top side, a bottom side and a peripheral edge, said panel having a diameter generally equal to an inner diameter of said bucket, a peripheral lip being coupled to and extending upwardly from said peripheral edge, said peripheral lip having a bottom edge having a slot extending upwardly therein and adapted for receiving a top edge of said bucket, said panel having an opening therein;

a door for selectively opening and closing said opening, said door having a shape generally identical to a shape of said opening, said door being hingedly coupled to said panel such that said door may be moved between an open and a closed position, said door having a plurality of holes extending therethrough;

said opening has a generally semi-circular shape such that a straight edge and an arcuate edge are defined;

said door has a size greater than said opening, said door being hingedly coupled to said bottom side of said panel such that said straight edge of said door is adjacent to and extending along a length of said straight edge of said opening; and a securing means for selectively securing said door in said closed position, said securing means comprising a latch rotatably coupled to said door, said latch including a rod rotatably coupled to said door and a plate extending away from said rod in a perpendicular orientation to said rod, said rod being located generally adjacent to said arcuate edge of said door, said plate being positionable over said top side of said panel.

2. A lid device for removably coupling to a top edge of a bucket for converting said bucket into a minnow bucket, said device comprising:

a panel having a top side, a bottom side and a peripheral edge, said panel having a diameter generally equal to an inner diameter of said bucket, a peripheral lip being coupled to and extending upwardly from said peripheral edge, said peripheral lip having a bottom edge having a slot extending upwardly therein and adapted for receiving a top edge of said bucket, said panel having an opening therein, said opening having a generally semi-circular shape such that a straight edge and an arcuate edge are defined, an aperture extending through said panel, a plug being removably positionable in said aperture and frictionally coupling to an edge of said aperture;

a door for selectively opening and closing said opening, said door having a shape generally identical to a shape of said opening and having a straight edge and an arcuate edge, said door having a size greater than said opening, said door being hingedly coupled to said bottom side of said panel such that said straight edge of said door is adjacent to and extending along a length of said straight edge of said opening such that said door may be moved between an open and a closed position, said door having a plurality of holes extending therethrough; and a securing means for selectively securing said door in said closed position, said securing means comprising a latch rotatably coupled to said door, said latch including a rod rotatably coupled to said door and a plate extending away from said rod in a perpendicular orientation to said rod, said rod being located generally adjacent to said arcuate edge of said door, said plate being positionable over said top side of said panel.

* * * * *